April 12, 1960

G. J. E. SMITH-PERT 2,932,180

EXPANSION COUPLINGS

Filed Oct. 21, 1957

United States Patent Office 2,932,180
Patented Apr. 12, 1960

2,932,180

EXPANSION COUPLINGS

George James E. Smith-Pert, Yeovil, England, assignor to Westland Aircraft Limited, Yeovil, England Application October 21, 1957, Serial No. 691,486

Claims priority, application Great Britain October 25, 1956

8 Claims. (Cl. 64—23)

This invention relates to an improved form of expansion coupling more particularly for use in connection with transmitting a drive from a driving means to a driven means.

It is well known that under operating conditions relative expansion occurs between a prime mover for example a gas turbine engine and its associated driven components for example a gear box or pump.

Torque transmitting couplings allowing for axial expansion have been incorporated between prime movers and associated driven components of the type wherein the coupling takes the form of male and female splined members so allowing for axial expansion. A disadvantage of this type of expansion coupling lies in the fact that upon expansion occurring during transmission between the prime mover and its associated driven component high sliding frictional and high thrust loads are set up necessitating relatively large thrust bearings.

It is an object of this invention therefore to overcome this disadvantage and provide an expansion-torque transmitting coupling having relatively low frictional loads imposed upon it during expansion.

It is a further object of the invention to provide an expansion torque transmitting coupling provided with a small degree of universal movement.

A further feature of this invention is an expansion torque transmitting coupling according to the two preceding paragraphs wherein a flexible diaphragm is provided on the driven member of the coupling to accommodate excess lubricating fluid during expansion of the coupling.

A further feature of this invention is to provide an expansion torque transmitting coupling according to the three preceding paragraphs in which two or more balls are centrally disposed in grooves of circular cross section to provide means transmitting rotary movement between a first and second member.

Further objects of this invention will become apparent for the following description.

In carrying the invention into effect according to one convenient form by way of example in the drawings filed with the specification:

Figure 1:
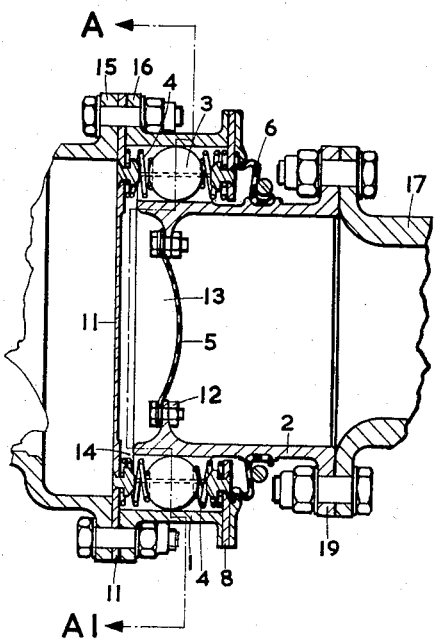
Fig. 1 is a longitudinal sectional view of the expansion coupling.
Figure 2:
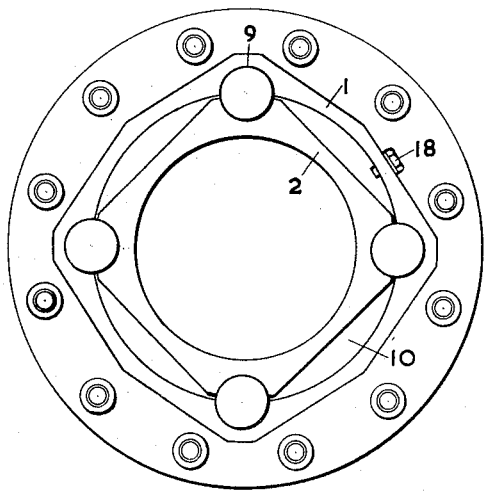
Fig. 2 is a transverse sectional view taken substantially as indicated by line A—A1, Fig. 1.

Referring to Figs. 1 and 2, an expansion torque transmitting coupling is provided between a driving flange 15 of a gas turbine and a driven flange 19, of housing 2, rigidly attached to a shaft 17 for transmitting power to a gear box (not shown).

The coupling itself comprises two concentric housings 1 and 2, balls 3, helically wound springs 4, flexible diaphragm 5, flexible sealing ring 6, and spring retaining plates 8 and 11.

Housings 1 and 2 are a push fit one within the other and grooves of circular cross section 9 are machined out to receive balls 3 with a small clearance of .005" for example. The length of grooves 9 being governed by the amount of calculated expansion. Surplus metal between each groove is machined away as generally indicated at 10. Thus housings 1 and 2 are provided concentric with each other with provision for the insertion of balls 3 within grooves 9.

At each end of housing 1 are provided spring and ball retaining plates 8 and 11 of annular cross section.

Either side of each ball 3 and attached to retaining plates 8 and 11 are springs 4 which position ball 3 substantially midway in groove 9 when the coupling is at rest.

Referring to housing 2 a diaphragm 5 sealably attached in the manner shown at 12 serves to seal off the bore of said housing whilst a flexible seal 6 is attached to spring retaining plate 8 and the periphery of housing 2.

A chamber 13 formed on one side by flexible diaphragm 5 and spring retaining plate 11 on the other side is in communication with grooves 9 as indicated at 14. The chamber 13, passage 14 and grooves 9 are filled with a suitable lubricating fluid introduced through filler plug 18.

Having thus described the general construction of the coupling, in operation rotary movement is transmitted from the gas turbine engine power take off flange indicated at 15 to housing 1. Rotary movement is then transmitted between housings 1 and 2 via balls 3 rotating in said lubricating fluid. When expansion occurs through the gas turbine engine, flange 15 coupled to flange 16 of housing 1 will move to the right in turn carrying with it spring retaining plates 8 and 11, springs 4, balls 3 and flexible seal 6. A certain amount of pressure build up will occur in grooves 9 which is instantly relieved by some of the lubricating fluid passing from gooves 9 via passages 14 into flexible chamber 13.

Thus any expansion through this coupling is efficiently provided for with very small rolling frictional loads being involved therefore insuring that only comparatively small thrust loads are developed.

Having provided a torque transmitting coupling capable of allowing for axial expansion during rotating a certain amount of universality is provided for by reason of the clearance provided for between the housings 1 and 2. Thus small misalignment between engine power take off point and power delivery point will be counter balanced by the universality of the expansion coupling.

I claim as my invention:
1. An axially expansive coupling providing a sealed, torque transmitting connection between a driving member and a driven member, comprising a hollow driving member, a hollow driven member having one end concentrically disposed within an end of said driving member, first closure means within said driving member, flexible second closure means within said driven member, flexible means sealing lubricant within the annular space between said driving member, said driven member, and said first and second closure means, torque-transmitting means interconnecting said driving member and said driven member, and positioning means cooperating with said torque-transmitting means.

2. A coupling according to claim 1 wherein said first closure means comprises a plate secured across the hollow interior of said driving member.

3. A coupling according to claim 2 wherein said flexible second closure means comprises a flexible diaphragm across the end of said driven member disposed within said driving member.

4. A coupling according to claim 3 wherein said flexible sealing means comprises a flexible ring joining the open end of said driving member with said driven member.

5. A coupling according to claim 4 wherein said torque-transmitting means comprises internal recesses within said hollow driving member, external recesses on said driven member, said external recesses registering with said internal recesses, and torque transmitting balls engaging said internal and said external recesses.

6. A coupling according to claim 5 wherein said positioning means comprises springs centering said torque-transmitting balls between said plate and said flexible ring.

7. A coupling according to claim 6 wherein said flexible ring is so joined with said driven member as to leave the end of said driven member disposed within said driving member normally separated from said plate.

8. An axially expansive coupling providing a sealed, torque-transmitting connection between a driving member and a driven member, comprising a female collar at one end secured to a plate on said driving member and having internal recesses, a male collar at one end secured to said driven member and concentrically disposed within said female collar, said male collar having external recesses registering with said internal recesses, a flexible diaphragm across the open end of said male collar, a flexible ring joining the open end of said female collar with said male collar so as to leave the open end of said male collar normally separated from said plate, torque-transmitting balls engaging said internal and said external recesses, ball-centering means between said ring and said plate, and lubricant filling the annular space between the above-named elements.

References Cited in the file of this patent

UNITED STATES PATENTS

| | | |
|---|---|---|
| 1,861,364 | Schreck | May 31, 1932 |
| 2,352,776 | Dodge | July 4, 1944 |
| 2,441,052 | Wilmer | May 4, 1948 |
| 2,453,964 | Betz | Nov. 16, 1948 |